(12) United States Patent
Gauthier et al.

(10) Patent No.: US 7,913,594 B2
(45) Date of Patent: *Mar. 29, 2011

(54) RATCHETING TORQUE WRENCH

(75) Inventors: Michael T. Gauthier, Grafton, WI (US);
Steven S. Landowski, Random Lake, WI (US)

(73) Assignee: Gauthier Biomedical, Inc., Grafton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/241,696

(22) Filed: Sep. 30, 2008

(65) Prior Publication Data

US 2009/0025518 A1    Jan. 29, 2009

Related U.S. Application Data

(63) Continuation of application No. 11/750,175, filed on May 17, 2007, now Pat. No. 7,430,945, which is a continuation-in-part of application No. 11/645,942, filed on Dec. 27, 2006, now Pat. No. 7,413,065, which is a continuation of application No. 11/232,634, filed on Sep. 22, 2005, now Pat. No. 7,156,216, which is a continuation of application No. 10/969,402, filed on Oct. 20, 2004, now Pat. No. 6,948,605, which is a continuation of application No. 10/342,707, filed on Jan. 15, 2003, now Pat. No. 6,817,458.

(60) Provisional application No. 60/348,516, filed on Jan. 16, 2002, provisional application No. 60/802,747, filed on May 23, 2006.

(51) Int. Cl.
*B25B 23/14* (2006.01)
*B25B 23/143* (2006.01)

(52) U.S. Cl. .......................................... 81/467; 81/480
(58) Field of Classification Search .................... 81/467, 81/476, 478, 480; 192/44, 45, 54.52
See application file for complete search history.

(56) References Cited

U.S. PATENT DOCUMENTS

| | | | | | |
|---|---|---|---|---|---|
| 2,332,971 | A | * | 10/1943 | Johnson | 81/480 |
| 2,601,044 | A | * | 6/1952 | Mayer | 81/480 |
| 2,601,799 | A | * | 7/1952 | Garwood | 81/480 |
| 2,768,547 | A | * | 10/1956 | Noell | 81/480 |
| 2,786,377 | A | * | 3/1957 | Riess | 81/480 |
| 2,826,107 | A | * | 3/1958 | Woods | 81/480 |
| 2,831,383 | A | * | 4/1958 | Riess | 81/480 |
| 2,972,271 | A | * | 2/1961 | Gill | 81/480 |
| 3,651,718 | A | * | 3/1972 | Thomasian | 81/480 |
| 3,922,935 | A | * | 12/1975 | Dahlem | 81/480 |
| 3,958,469 | A | * | 5/1976 | Meese | 81/58.3 |
| 4,238,978 | A | * | 12/1980 | Leone | 81/480 |
| 4,466,523 | A | | 8/1984 | De Carolis et al. | |

(Continued)

*Primary Examiner* — David B Thomas
(74) *Attorney, Agent, or Firm* — Boyle Fredrickson SC (57) ABSTRACT

A tool is provided for driving fasteners that includes a torque limiting mechanism therein. The torque limiting mechanism includes a first frictional engagement member disposed on the drive shaft for the tool that is engaged by one or more second frictional engagement members disposed on one or more sides of the first frictional member. The second frictional engagement members are biased into engagement with the first member by biasing members disposed within the handle that can be adjusted in order to provide more or less of a biasing force to control the frictional engagement of the second member with the first member and thereby control the torque limiting function of the torque limiting mechanism. In addition, a drive shaft is also engaged with a ratcheting mechanism that enables the tool to drive a fastener into a suitable substrate in only a single direction.

10 Claims, 4 Drawing Sheets

U.S. PATENT DOCUMENTS

| | | |
|---|---|---|
| 5,437,212 A | 8/1995 | Thompson et al. |
| 5,520,073 A | 5/1996 | Bakula et al. |
| 5,535,648 A | 7/1996 | Braun et al. |
| 5,551,323 A | 9/1996 | Beere et al. |
| 5,613,585 A | 3/1997 | Tiede |
| 5,619,891 A | 4/1997 | Tiede |
| 5,622,089 A | 4/1997 | Gifford, Sr. |
| 5,643,089 A * | 7/1997 | Hummel ......................... 464/37 |
| 5,647,252 A | 7/1997 | Miner |
| 5,749,272 A | 5/1998 | Phan |
| 5,771,760 A | 6/1998 | Tiede |
| 5,778,743 A | 7/1998 | Tiede |
| 5,848,680 A | 12/1998 | Rinner |
| 5,910,196 A | 6/1999 | Huang |
| 5,928,154 A | 7/1999 | Silber et al. |
| 5,943,755 A | 8/1999 | Gauthier et al. |
| 6,990,877 B1 * | 1/2006 | Wu ................................. 81/467 |
| 7,066,056 B1 * | 6/2006 | Hsieh ............................. 81/63.2 |
| 7,334,509 B1 * | 2/2008 | Gao ................................ 81/475 |
| 7,343,824 B2 * | 3/2008 | Gao ........................... 73/862.21 |
| 7,389,700 B2 * | 6/2008 | Gao ........................... 73/862.21 |
| 2005/0268758 A1 * | 12/2005 | Chuan ............................ 81/467 |
| 2007/0039425 A1 * | 2/2007 | Wang ............................. 81/467 |
| 2007/0289391 A1 * | 12/2007 | Gao ........................... 73/862.21 |

* cited by examiner

RATCHETING TORQUE WRENCH

CROSS-REFERENCE TO RELATED APPLICATIONS

This application claims priority as a continuation application from U.S. patent application Ser. No. 11/750,175, filed May 17, 2007, now U.S. Pat. No. 7,430,945, which is a continuation-in-part application from U.S. patent application Ser. No. 11/645,942, filed Dec. 27, 2006, now U.S. Pat. No. 7,413,065, which is a continuation of U.S. patent application Ser. No. 11/232,634, filed Sep. 22, 2005, now U.S. Pat. No. 7,156,216, which is a continuation of U.S. patent application Ser. No. 10/969,402, filed Oct. 20, 2004, now U.S. Pat. No. 6,948,605, which is a continuation of U.S. patent application Ser. No. 10/342,707, filed Jan. 15, 2003, now U.S. Pat. No. 6,817,458, which claims priority from U.S. Provisional Patent Application Ser. No. 60/348,516, filed Jan. 16, 2002, and which also claims priority from U.S. Provisional Patent Application Ser. No. 60/802,747, filed May 23, 2006.

FIELD OF THE INVENTION

The present invention relates to torque wrenches, and, more specifically, to a torque wrench including both a torque limiting mechanism and a ratcheting mechanism disposed within the handle of the wrench.

BACKGROUND OF THE INVENTION

In order to drive a screw or other fastener into a substrate, wrenches, such as torque wrenches are often utilized. Torque wrenches are utilized primarily because of their capability to control the amount of torque that can be applied to the fastener while the fastener is being driven into the substrate. Thus, the fastener can be driven into the substrate with the desired level of torque, thereby preventing damage from being done to the substrate as a result of overdriving the fastener into the substrate.

To accomplish this, a number of different torque limiting mechanisms have been developed for implementation within torque wrenches that allow the fastener-engaging portion of the wrench to slip with regard to the driving portion of the wrench when a preset maximum torque value has been exceeded.

However, with the majority of torque limiting mechanisms available, these mechanisms utilize friction as the primary source to develop torque on the mechanism. Therefore, it is desirable to develop an improved torque limiting mechanism that greatly lessens the amount of friction required in order to generate the torque in the torque limiting mechanism, such that the wear on the tool and torque limiting mechanism is reduced, lengthening the life of the tool.

Also, prior torque limiting mechanisms are limited in the amounts of torque value adjustments that can be made as a result of the particular construction of the mechanisms. Thus, it is also desirable to develop an improved torque limiting mechanism that enables finer adjustments of the torque limiting values at which the mechanism can operate.

In addition, a number of wrenches in use employ a ratcheting mechanism to enable the wrench to be used to selectively drive or remove a fastener from a substrate. These mechanisms enable the wrench to be rotated in only one direction, such that the wrench can only be rotated in the direction that either drives or removes the fastener from the substrate as desired.

However, while the ratchet tools currently used in the medical field and in other areas are capable of tightening screws and other fasteners, any prior art ratchet tools suffer from a number of problems that prevent the tools from being utilized most efficiently. One problem is that often times it is difficult for an individual using the ratchet tool to determine when the fastener is tightened to the proper amount based as a result of the construction of the ratchet tool. More specifically, most ratchet tools have a "sloppy feel" as a result of their design, which prevents an individual from feeling the resistance exerted on the tool by the fastener in order to accurately determine when the fastener is properly tightened. Also, when external attachments or shaft couplers are connected to the tool, the loss of feel when utilizing the tool is compounded.

Further, another problem associated with prior art ratchet tools arises due to the positioning of the central gear within the tool. More particularly, when the tool has been used for a certain amount of time, the central gear in the ratcheting mechanism tends to move out of concentricity with the handle of the tool, such that the gear "runs out" with regard to the handle, thereby limiting the effectiveness of the tool.

Finally, another shortcoming of the prior art ratchet tools arises because tools utilized in medical scenarios must be sterilized between uses. Based on the open construction of prior art tools, the use of cleaning solutions to sterilize tools of this type often times cannot adequately clean the internal portions of the tool such that the tool retains dirt or other debris, including residual cleaning fluid, within the interior of the mechanism which can significantly affect the ability operation of the tool to be used.

Therefore, it is desirable to develop a torque wrench tool that includes both an improved torque limiting mechanism optionally in conjunction with an improved ratcheting mechanism to allow for the finer adjustment of the maximum torque values for the tool, as well as enabling the tool to provide adequate feel of the resistance of the fastener through the tool. The improved ratchet tool construction should also effectively prevent any run out of the central gear with respect to the tool, while also effectively sealing off the interior of the tool from the exterior of the tool such that no fluid, gas or debris can get into the tool and affect the operation and/or usefulness of the tool.

SUMMARY OF THE INVENTION

According to a first aspect of the present invention, a driving tool includes a drive shaft disposed within a housing forming a handle for the tool. The drive shaft that is formed with an inner portion having an engaging ring disposed around the inner portion. The engaging ring including a number of engaging surfaces, such as slots, spaced around the periphery of the engaging ring. The inner portion of the drive shaft and the engaging ring are inserted within the handle housing such that the drive shaft is rotatable with respect to the handle. On opposite sides of the handle are disposed additional engaging surfaces or members that can contact the engaging surfaces on the engaging ring. The additional engaging surfaces can take various forms, such as plungers that hold a number of elongate pins therein that are selectively engageable with the engaging surfaces on the engaging ring. This provides the torque limiting mechanism with an opposed construction instead of an in-line construction to provide the handle incorporating the torque limiting mechanism with a low profile. However, the construction of the tool can also incorporate the torque limiting mechanism in an in-line construction, if desired. The engaging surfaces on the plungers are urged into engagement with the engaging surfaces on the engaging ring secured to the drive shaft by biasing members extending between the plungers and end caps affixed to opposed ends of the handle. The bias of the springs urges the plungers and engaging surfaces thereon into engagement with the slots to enable the engaging ring and the drive shaft to rotate in conjunction with the handle to drive the fastener into the substrate. However, should the torque transmitted through the drive shaft to the handle and plungers exceed the biasing force of the biasing members, the torque created by the rotation of the drive shaft will cause the drive shaft to push the engaging surfaces on the plungers past or out of engagement with the surfaces on the engaging ring, allowing the drive shaft to rotate independently of the handle. This mechanism greatly reduces the friction and resulting wear in the mechanism, lengthening the useful life of the tool.

According to still a further aspect of the present invention, the configuration of the engaging surfaces, e.g., depth of the slots on the engaging ring secured to the drive shaft, can be varied to increase or decrease the torque values that are provided by the mechanism for the tool without varying the biasing members utilized in the construction of the mechanism.

According to still another aspect of the present invention, the tool is additionally formed with a ratcheting mechanism that includes a central gear rotatably mounted within a recess formed in the outer portion of the drive shaft in a manner that prevents the gear from shifting axially or laterally with respect to the drive shaft. The gear is operably connected to the drive shaft opposite the inner portion and is located at least partially within the housing for the tool. The drive shaft supports the central gear, which defines a central opening, into which a shaft extender or other fastener-engaging device can be inserted, and has a number of teeth spaced around the periphery thereof. The shaft and the gear are maintained in position within the housing by a bearing positioned around the shaft adjacent the gear and engaged with the housing opposite the shaft. The bearing includes a smooth or otherwise essentially frictionless interior surface that is contacted by the shaft in order to enable the shaft to rotate freely with respect to the bearing. On the outer surface of the bearing, each bearing can include a sealing member that is engaged with the housing to both secure the bearing with regard to the housing, thereby preventing the bearing and the shaft positioned within the bearing from shifting with regard to the housing during the operation of the tool, and to seal the interior of the housing inwardly from the bearings. Thus, the gear which is attached to the shaft is prevented from shifting laterally or axially within the housing.

Because the gear is maintained in both a lateral and axial position with respect to the housing, the gear is maintained in proper alignment with a pair of pawls also disposed within the outer portion of the drive shaft and selectively engageable with the teeth on the exterior of the gear. Upon selectively engaging one or the other of the pawls with the gear, the rotation of the gear and the drive shaft can be controlled or directed in either a counterclockwise or clockwise direction as desired when operating the tool.

According to another aspect of the present invention, the ratcheting mechanism also includes a cap engageable with the bearing over the recess in which the mechanism is located that includes a central aperture aligned with the central opening in the gear. The cap includes a sealing member disposed along the periphery of the central aperture that sealingly engages the gear around the central opening in order to provide a fluid tight seal therebetween. The cap also engages a sealing surface disposed on the exterior of the housing around the recess on which another sealing member can be positioned in order to provide a fluid tight seal between the bearing and the cap. Therefore, when cleaning the tool after use or using the tool in environments where fluids are present, the fluids are prevented from penetrating past the bearing into the interior of the housing. As a result, no liquid, gas, debris or residual cleaning material is able to affect the normal operation of the mechanism.

According to still another aspect of the present invention, the mechanism can include a number of bearings disposed within the recess and around the gear depending on the torque to be applied using the tool. In situations where the torque to be applied is minimal, only one bearing may be necessary to prevent any run out of the central gear with respect to the outer portion of the drive shaft. However, in situations where the tool is used to apply more torque to a fastener in order to tighten or remove the fastener, additional bearings may be positioned within the recess to maintain the position of the gear within the mechanism even with the increased torque applied from the tool.

Numerous other aspects, features, and advantages of the present invention will be made apparent from the following detailed description together with the drawings figures.

BRIEF DESCRIPTION OF THE DRAWINGS

The drawings illustrate the best mode currently contemplated of practicing the present invention.

In the drawings.

DETAILED DESCRIPTION OF THE INVENTION

Figures 1, 2, 3, 4, 5, 6:
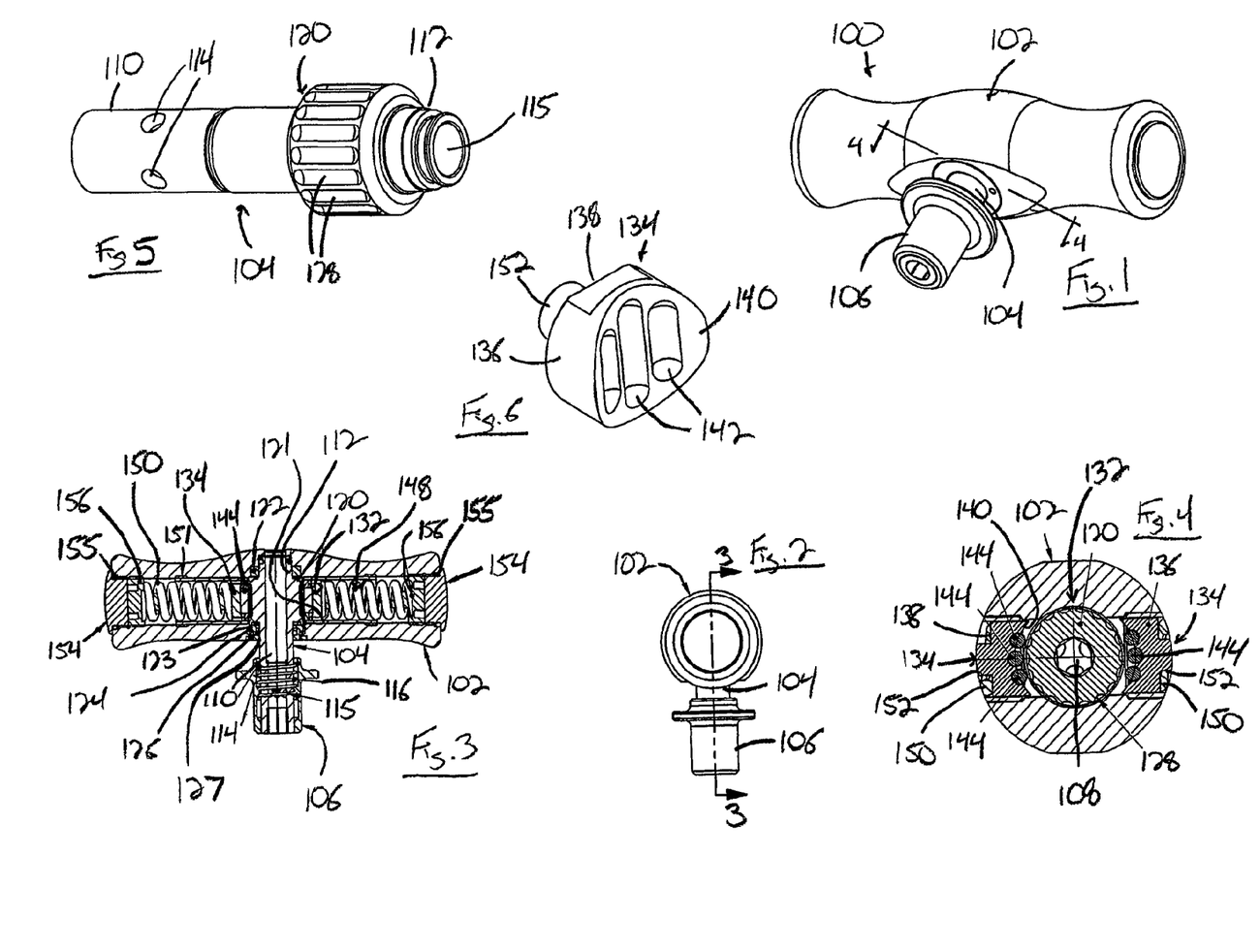
FIG. 1 is an isometric view of a first embodiment of a torque wrench constructed according to the present invention including a torque limiting mechanism.
FIG. 2 is a side plan view of the wrench of FIG. 1.
FIG. 3 is a cross-sectional view along line 3-3 of FIG. 2.
FIG. 4 is a cross-sectional view along line 4-4 of FIG. 1.
FIG. 5 is an isometric view of a first embodiment of the drive shaft utilized in the torque limiting mechanism of the wrench of FIG. 1.
FIG. 6 is an isometric view of a first embodiment of a plunger utilized in the mechanism of FIG. 1.

With reference now to the drawing figures in which like reference numerals designate like parts throughout the disclosure, a first embodiment of a torque wrench constructed according to the present invention is indicated generally at 100 in FIG. 1. The wrench 100 includes a handle 102 from which extends a shaft 104 having a drive shaft release member 106 attached thereto opposite the handle 102. Release member 106 is utilized to secure a drive shaft 108 thereto in order to drive a fastener (not shown) that is engaged by the fastener-engaging shaft 108 into a substrate.

Looking now at FIGS. 3-5, the drive shaft 104 includes an outer section 110 integrally connected to an inner section 112 that is positioned within the handle 102. The outer section 110 is generally cylindrical in shape and includes a number of circular openings 114 spaced equidistant around the outer section 110. The openings 114 are adapted to receive ball bearings (not shown) therein that are used to engage and retain the fastener-engaging shaft 108 that is inserted into a central channel 115 defined within the outer section 110. The ball bearings can be moved into and out of the openings 114 and the channel 115 by the movement of the release member 106 in opposition to a spring 116 secured between the outer section 110 of the shaft 104 and the release member 106. When the release member 106 is moved along the shaft 104 against the bias of the spring 116, the ball bearings can move into the openings 114 and out of the channel 115, thereby exposing the interior of the channel 115 to enable the fastener-engaging shaft 108 to be inserted therein. Once a notch (not shown) on the fastener-engaging shaft 108 is aligned with the openings 114, the release member 106 can be released such that the spring 116 moves the release member 106 over the openings 114 into the channel 115 to urge the ball bearings through the openings 114 and partially into the notch, thereby holding the fastener-engaging shaft 108 in connection with the shaft 104.

The inner section 112 of the shaft 104 includes an engaging ring 120 that is disposed within the handle 102 around the inner section 112 in alignment with a longitudinal channel 121 that extends completely through the handle 102. The inner section 112 and engaging ring 120 are rotatably mounted within the channel 121 in the handle 102 by a roller bearing 122 secured within the handle 102 and against which the engaging ring 120 are pressed. Opposite the roller bearing 122, the engaging ring 120 is held within the handle 102 by a wear ring 123 abutting the engaging ring 120, and on which the ring 120 can rotate, as well as an O-ring 124 and cover cap 126 that each defines a central opening 127 therein through which the shaft 104 can extend outwardly from the handle 102. The O-ring 124 and cap 126 operate to effectively seal off the interior of the channel 121 in the handle 102, to prevent and dirt or other debris or moisture from entering the handle 102 and interfering with the operation of a torque limiting mechanism 132, of which the engaging ring 120 forms a part.

The engaging ring 120 disposed on the inner section 112 of the shaft 104 has an outer diameter greater than the diameter of both the outer section 110 and the remainder of the inner section 112, and includes a number of engaging surfaces 128, such as longitudinal grooves, spaced therearound. The grooves 128 are spaced equidistant from one another around the entire periphery of the engaging ring 120, and define flat sections 130 between each adjacent pair of grooves 128. While the grooves 128 are illustrated in the drawing figures as being generally shaped as elongate ovals, the grooves 128 can have any desired or suitable shape as well, such as circular in shape, or can be made to have different shapes for adjacent grooves 128 to provide additional functionality to the mechanism 132.

Referring now to FIGS. 3 and 4, in order to provide the torque limiting function with regard to the rotation of the engaging ring 120 on the inner section 112 of the shaft 104 with regard to the handle 102, a biasing member of the torque limiting mechanism 132 is disposed within the longitudinal channel 121 inside the handle 102 and engaged with the engaging ring 120. The mechanism 132 is entirely disposed within the handle 102 and in a first embodiment includes a pair of plungers 134 disposed adjacent opposite sides of the engaging ring 120. In a particularly preferred embodiment best shown in FIG. 6, each plunger 134 includes a body 136 having a generally circular cross-section and defining a flat rear surface 138 and a concave front surface 140, though other configurations for the plunger 134 can also be utilized. The concave front surface 140 includes one or more engaging surfaces 144, preferably formed from which elongate pins 144 rotatably positioned within elongate slots 142 formed in the concave surface 140 of the plunger 134. The shape for the slots 142 and pins 144 corresponds to the shape of the groves 128 formed in the engaging ring 120. While three slots 142 and pins 144 are illustrated in the drawings, a larger or smaller number of slots 142 and/or pins 144 can be used in each plunger 134. Further, the pins 144 can be located in any number of the slots 142, such as in one or more of the outer slots 142 offset from the centerline of the shaft 104. The spacing of the slots 142 in the concave surface 140 of the plunger 134 defines flat sections 146 therebetween that correspond to the distance between the grooves 128 on the engaging ring 120. The pins 144 held within the slots 142 have an overall diameter greater than the depth of the slots 142, such that a portion of the pins 144, and preferably about half of the volume of each pin 144, projects outwardly from the slots 142 and into the grooves 128 on the engaging ring 120 on the inner section 112 of the shaft 104. While the grooves 128 and pins 144 are the preferred construction for this embodiment of the torque limiting mechanism 132, other configurations for the surfaces 128 and 144 are also contemplated as being within the scope of the present invention.

The plungers 134 and pins 144 are biased into engagement with the grooves 128 on the engaging ring 120 by a pair of compression members 148 that engage the rear surfaces 138 of each plunger 134. The compression members 148 exert a biasing force on the plungers 134 to urge the plungers 134 and the pins 144 in each plunger 134 into contact with the grooves 128 in the engaging ring 120. The compression members 148 can be formed as desired with a suitable configuration and components to urge the plungers 134 toward the engaging ring 120 with the appropriate level of force, but are preferably formed from compression springs 150, which can be a coil spring, or a number of spring washers, among other suitable compression members. The springs 150 extend through guide tubes 151 located within the channel 121 adjacent the expanded section 120, and seat at one end around a projection 152 extending outwardly from the rear surface 138 of the body 136 to maintain the springs 150 operably connected to the plungers 134. Opposite the plungers 134, each spring 150 is held at the desired level of compression to exert the desired force on the plungers 134 by an end cap 154 sealingly engaged with the handle 102 within each end of the longitudinal channel 121. Each end cap 154 is sealingly engaged to the handle 102 within the channel 121 by an O-ring 155, and includes thereon an adjustment nut 156 that extends into the channel 121 and can be used to expand or contract the size of the end cap 154 such that the caps 154 can be moved within the channel 121 to vary the amount of compression provided by the springs 150 against the plungers 134. The position of the nuts 156 can be determined or measured as necessary in any suitable manner during assembly of the wrench 100, or alternatively during use of the wrench 100, to ensure that the maximum torque value for the mechanism 132 is set as desired. Thus, the amount of force provided by the springs 150 urging the plungers 134 and pins 144 into engagement with the grooves 128 on the engaging ring 120 can be varied to set a maximum torque limit for the activation of the mechanism 132 where desired.

In operation, when this maximum torque value has been reached and/or exceeded by the force applied in the turning of the handle 102 to drive a fastener into a substrate by an individual, the force exerted to turn the handle 102 will overcome the bias of the springs 150 urging the plungers 134 into engagement with the engaging ring 120. As a result, the force rotating the handle 102 and the plungers 134 and the pins 144, will cause the pins 144 and plungers 134 to move out of the grooves 128 within which they are seated and towards the end caps 154 against the bias of the springs 150. As the pins 144 are moved out of the associated grooves 128, the handle 102 can rotate independently with respect to or around the engaging ring 120 and shaft 104 until the pins 144 become seated in an adjacent groove 128.

In addition, while the depth of each of the grooves 128 on the engaging ring 120 is preferably uniform, in an alternative embodiment the depth of each groove 128 can be varied to increase or decrease the volume of the pins 144 that can be seated in the grooves 128, consequently varying the torque values provided by the mechanism 132 from the springs 150, without physically changing the springs 150.

Figures 7, 8:
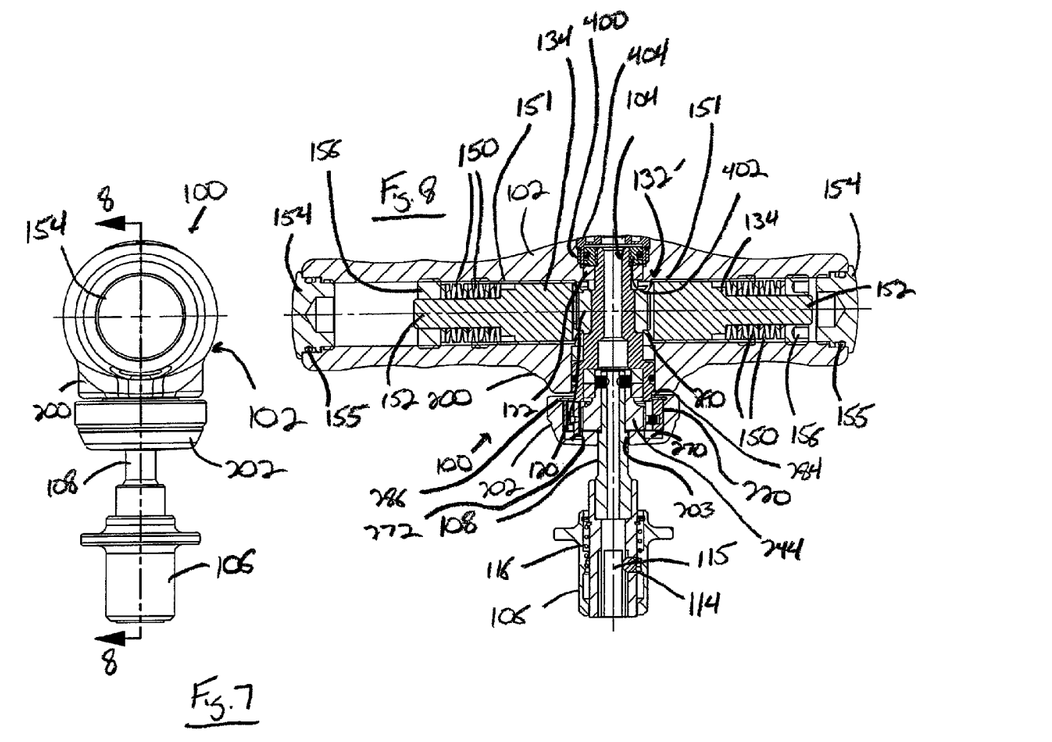
FIG. 7 is a side plan view of a second embodiment of the tool of FIG. 1 incorporating a second embodiment of a torque limiting mechanism and a ratcheting mechanism.
FIG. 8 is a cross-sectional view along line 8-8 of FIG. 7.
Figure 9:
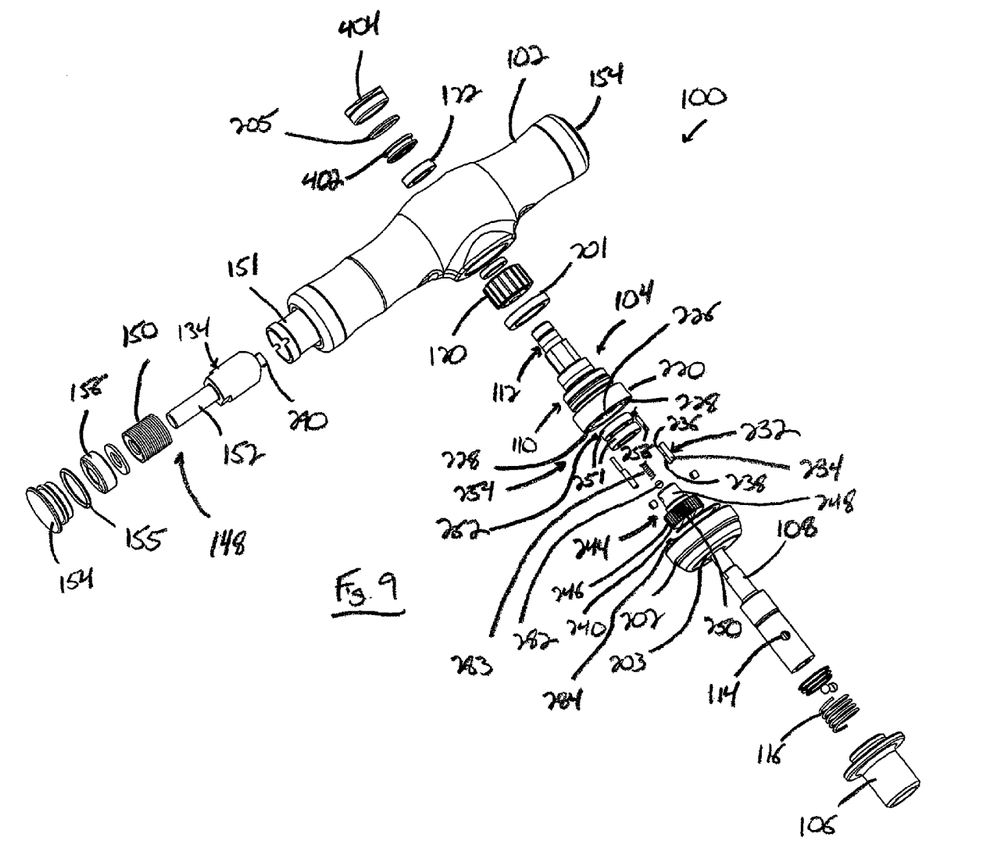
FIG. 9 is an exploded isometric view of the tool of FIG. 7.

Referring now to FIGS. 7-9, a second embodiment of the wrench 100 is illustrated. In this embodiment, the drive shaft 104 is offset from the center of the handle 102. Thus, the drive shaft 104 and fastener-engaging shaft 108 are positioned closer to one side of the handle 102, which allows the tool 100 to be utilized in locations where the previous embodiment of the tool 100 would be unworkable due to the length of the handle 102 extending from opposite sides of the drive shaft 104.

Further, as best shown in FIG. 8, due to the extended length of one side of the handle 102, the adjustment nut 156 is separated from the end cap 154 and disposed entirely within the channel 121 to vary the compression of the springs 150, thereby controlling the maximum torque level at which the mechanism 132 can be operated. In a preferred embodiment, the adjustment nut 156 is threadedly engaged with the interior of the channel 121 such that the nut 156 can be advanced or retracted within the channel 121 to the desired location to vary the level of force applied by the compression members 148 on the plunger 134. Once positioned, the nut 156 can be secured at that position utilizing a suitable adhesive, or can be left unadhered, such that the nut 156 can be readjusted as necessary. Additionally, to assist in keeping the compression members 148 engaged with the nuts 156, each nut 156 can be formed with a forwardly facing stub (not shown) around which the compression member 148 can be seated opposite the projection 152 on the plunger 134. The length of the stub is sufficient to hold the compression member 148 on the nut 156 without affecting the biasing properties of the compression member 148.

Looking again at FIGS. 7-9, in addition to the offset of the shaft 104 in the handle 102, the handle 102 includes a separate housing extension 200 located between opposed ends of the handle 102 and into which the shaft 104 extends from the handle 102. The housing 200 is disposed in alignment with the drive shaft 104 and encloses the portion of the drive shaft 104 extending outwardly from the channel 121. The housing 200 includes an end cap 202 that defines an opening 203 therein through which the fastener-engaging shaft 108 can be inserted for engagement with the drive shaft 104. In this embodiment, the outer section 110 of the drive shaft 104 is formed to have a diameter slightly less than that of the housing 200, such that the outer section 110 can be movably secured within the housing 200 adjacent the end cap 202 by a bearing 201. The bearing 201 is, in turn, secured to the housing 200 opposite the handle 102 and defines a space therein for the shaft 104, such that the shaft 104 can rotate with respect to the bearing 201. Additionally, in order to form a liquid-tight seal around the interior components of the tool 100, a pair of sealing members 205 is disposed around the outer section 110 and the inner section 112 to effectively seal off the interior of the tool 100. Also, to make the attachment of the shaft 104 of the handle 102 more simple to construct, the handle 102 is formed with an aperture 400 opposite the housing 200, thus forming a channel completely through the handle in which the drive shaft 104 is disposed. The inner section 112 of the drive shaft 104 is secured within the aperture 400 by a locking nut 402 positioned between the aperture 400 and the inner section 112 of the drive shaft 104, which allows the shaft 104 to rotate within the handle 102. The nut 402 and the shaft 104 are enclosed within the handle 102 by a back cap 404 that generally conforms to the shape and contours of the handle 102. With this cannulated construction for the handle 102, the interior of the tool 100 can be accessed as desired during operation and/or for cleaning purposes.

As best shown in FIGS. 8 and 9, the housing 200 also holds a ratcheting mechanism 218 and a collar 220 fixed at one end to the drive shaft 104 and each positioned within the cap 202. The collar 220 is affixed to the outer section 110 of the drive shaft 104 opposite the inner section 112, and preferably is integrally formed with the outer section 110 of the drive shaft 104.

The collar 220 includes a generally circular central opening 226 that extends through the housing 220 in alignment with the central channel 115 of the outer section 110 of the drive shaft 104. A pair of slots 228 is disposed on opposite sides of the opening 226 and extends generally radially and tangentially outwardly from the openings 226. However, the slots 228 can also be offset from one another such that the slots 228 are not aligned or positioned as mirror images of each other. Each slot 228 defines a nesting portion (not shown) opposite the central opening 226 that is preferably generally circular or arcuate in shape, and circumscribes an arc of greater than 180°. More preferably, the nesting portion encompasses an arc of greater than 200° but not more than 250° to allow for sufficient movement within the portions. However, the slots 228 can be formed with any suitable configuration capable of functioning in the manner to be described.

The shape of each nesting portion is designed to pivotally receive and securely retain a pawl 232 therein. The pawls 232 are generally elongate members formed of a rigid material, such as a metal or hard plastic, that include a stem 234 having a generally circular cross-section and a diameter slightly less than the inner diameter of the nesting portion. The pawls 232 further include an arm 236 extending outwardly from the stem 234 and having a length sufficient to extend through the nesting portion through the remainder of the slots 228 and into the central opening 226. The arm 236 is generally rectangular in shape and includes an outer end 238 that is positionable within the central opening 226. To prevent the pawls 232 from interacting with the drive shaft 104 or the housing 200, the length of each pawl 232 is sufficient that the majority of the length of each pawl 232 is located within the housing collar 220. The overall length of the pawl 232 is such that when the pawls 232 are inserted fully into each slot 228 within the housing 220, a small portion of each pawl 232 is positioned outwardly of the housing 220 towards the cap 202, such that the pawls 232 can be engaged by the cap 202 in a manner to be described.

The outer end 238 of the arm 236 of each pawl 232 is positionable within the central opening 226 in order to engage one of a number of teeth 240 disposed on an outer surface 242 of a gear 244 rotatably disposed in the opening 226. The teeth 240 are formed of a size sufficient to enable the gear 244 to be rotated through an angle of about 210° in order to move the width of a single tooth 240. Therefore, the size of the teeth 240 allows for very small movements of the gear 244 with respect to the housing collar 220 providing a "smooth" feel so that a fastener engaged by mechanism 218 can be very precisely adjusted. Also, because the smaller size for the teeth 240 enables the teeth 240 to be positioned further from a central axis 245 of the gear 244, less stress or force is applied directly to the interface of the pawls 232 and the teeth 240, lessening the chance of the pawls 232 slipping over the teeth 240.

The gear 244 is generally cylindrical in shape including a first section 246 of the outer surface 242 on which the teeth 240 are disposed, and a second section 248. As best shown in FIG. 8, the outer diameter of the first section 246 of the gear 244 defined by the teeth 240 is slightly less than the inner diameter of the central opening 226, such that the gear 244 can rotate freely within the central opening 226 without interference from the housing collar 220. However, the second section 248 is held within the interior of the outer section 110 of the drive shaft 104 by bearing blocks 251 positioned around the second section 248 and fixed to the drive shaft 104, such that the gear 244 can rotate with respect to the drive shaft 104.

The gear 244 further defines a central aperture 250 extending into and through the first section 246, and including a number of spaced grooves (not shown) that extend the length of the aperture and which are adapted to receive and engage complementary ridges (not shown) disposed on the shaft 108 in order to securely hold the shaft 108 within the gear 244 and prevent slipping of the shaft 108 with respect to the gear 244.

The gear 244 is effectively prevented from rotating within the central opening 226 of the housing collar 220 by the engagement of the pawls 232 with the teeth 240 on the gear 244. The pawls 232 are biased into engagement with the teeth 240 by a pair of biasing members 254 disposed on opposite sides of the central opening 226 adjacent each slot 228.

In a particularly preferred embodiment, each of the biasing members 254 preferably includes a generally cylindrical pin 256 formed of a rigid material that is inserted into an elongate pin hole (not shown) located in the housing collar 220 adjacent each slot 228. The length of each pin 256 is preferably shorter than the length of each pawl 232, such that when the pins 256 are inserted into the holes, the pins 256 do not extend outwardly from the housing collar 220. However, in an alternative embodiment, the pins 256 can be formed to extend outwardly from the holes, for a purpose to be described Each pin 256 is inserted through a central, looped portion (not shown) of a torsion spring 262 in order to anchor the spring 262 within the housing collar 220. While the spring 262 is a preferred biasing element for use in the biasing members 254, other suitable elements can also be used, such as a resilient, deformable plastic member, or a leaf spring, among others. To anchor the spring 262, the central portion is inserted into the pin hole for engagement by the pin 256 through a channel (not shown) that extends between and intersects both the pin hole and the slot 228. Thus, the spring 262 is positioned along the channel 264 between the pin hole and slot 228. The engagement of the spring 262 with the pawl 232 maintains the outer end 238 of the arm 236 in engagement with the teeth 240 on the gear 244 to prevent rotation of the gear 244 in a direction toward the respective pawl 232.

The pawls 232 are maintained in or disengaged from the teeth 240 on the gear 244 by recess 270 disposed on an interior surface 272 of the cap 202. The portion of each pawl 232 extending outwardly from the slots 228 is positioned within the recess 270 on the cap 202 when the cap 202 is secured to the housing collar 220. When the cap 202 is rotated over the housing collar 220 such that the recess 270 comes into contact with the adjacent pawl 232, the pawl 232 is urged out of the central opening 226 away from the teeth 240 against the bias of the biasing member 254 to a disengaged position. In this position, the gear 244 is allowed to rotate in a direction toward the disengaged pawl 232, as the opposite pawl 232 is configured to allow rotation in this direction, but to prevent any rotation of the gear 244 in the opposite direction. The cap 202 can be formed with a single recess 270 that can engage both pawls 232, or can have two separate recesses 270, one to engage each pawl 232, such that the gear 244 can be made to rotate exclusively in either direction, depending on which pawl 232 is disengaged from the gear 244 by the recess(es) 270 on the cap 202.

In order to assist an individual in properly positioning the cap 202 to enable the recess 270 in the cap 202 to control the rotation of the gear 244 in one direction or the other, the cap 202 includes a number of depressions (not shown) disposed adjacent the recess 270. Each of the depressions is engageable with a spring-biased detent 282 positioned on the housing collar 220. When the cap 202 is rotated, the detent 282 is compressed inwardly into a bore (not shown) disposed in the housing collar 220 that retains the detent 282 such that the cap 202 can rotate above the detent 282. However when one of the depressions is positioned in alignment with the detent 282, a spring 283 positioned within the bore between the housing collar 220 and the detent 282 urges the detent 282 outwardly into engagement with the depression. The cap 202 is thus held in this position until such time as a sufficient force is applied by an individual to the cap 202 to disengage the depression from the detent 282. Further, to prevent the cap 202 from being rotated past the outermost depressions, the recess 270 can be configured to engage either the outwardly extending end of each pawl 232, or optionally with one of the pins 256 which functions as a stop for the rotation of the cap 202 with respect to the housing collar 220.

The cap 202 can be rotatably secured to the exterior of the drive shaft 104 in any conventional manner, but as shown in FIGS. 2 and 4, is preferably secured to the drive shaft 104 by the engagement of a circumferential clip 284 disposed on the exterior of the drive shaft 104 with a corresponding groove 286 disposed on the interior surface 272 of the cap 202. The engagement of the clip 284 and the groove 286 enables the cap 202 to rotate with respect to the drive shaft 104 and housing collar 220 as necessary without disengaging the cap 202, unless desired. Further, by engaging the clip 284 within the groove 286, a central opening 288 defined in the cap 202 is positioned in alignment with the central aperture 250 of the gear 244. Thus, the implement shaft 108 can be inserted through the opening 203 in the cap 202 and into engagement with the aperture 250 in the gear 244 in order to be utilized with the ratcheting mechanism 218. Also, to assist in rotating the cap 202, the cap 202 can be formed of any suitable material, such as a metal or a suitably rigid plastic that can have added grip enhancements, such as knobs (not shown) or other high friction structures, or materials.

In addition, in the torque limiting mechanism 132' for the tool 100 shown in FIGS. 7-9, the plungers 134 have a different construction in which the projections 152 on which the springs 150 are seated are extended in length, and in which the concave surface 140 is removed, In its place is disposed a single projection 290 that has a generally circular cross-section. The projection is biased into engagement with the grooves 128 on the engagement ring 120 in the manner described previously, though the depth and shape of the grooves 128 are both shallower and narrower than in the previous embodiment.

Figure 10:
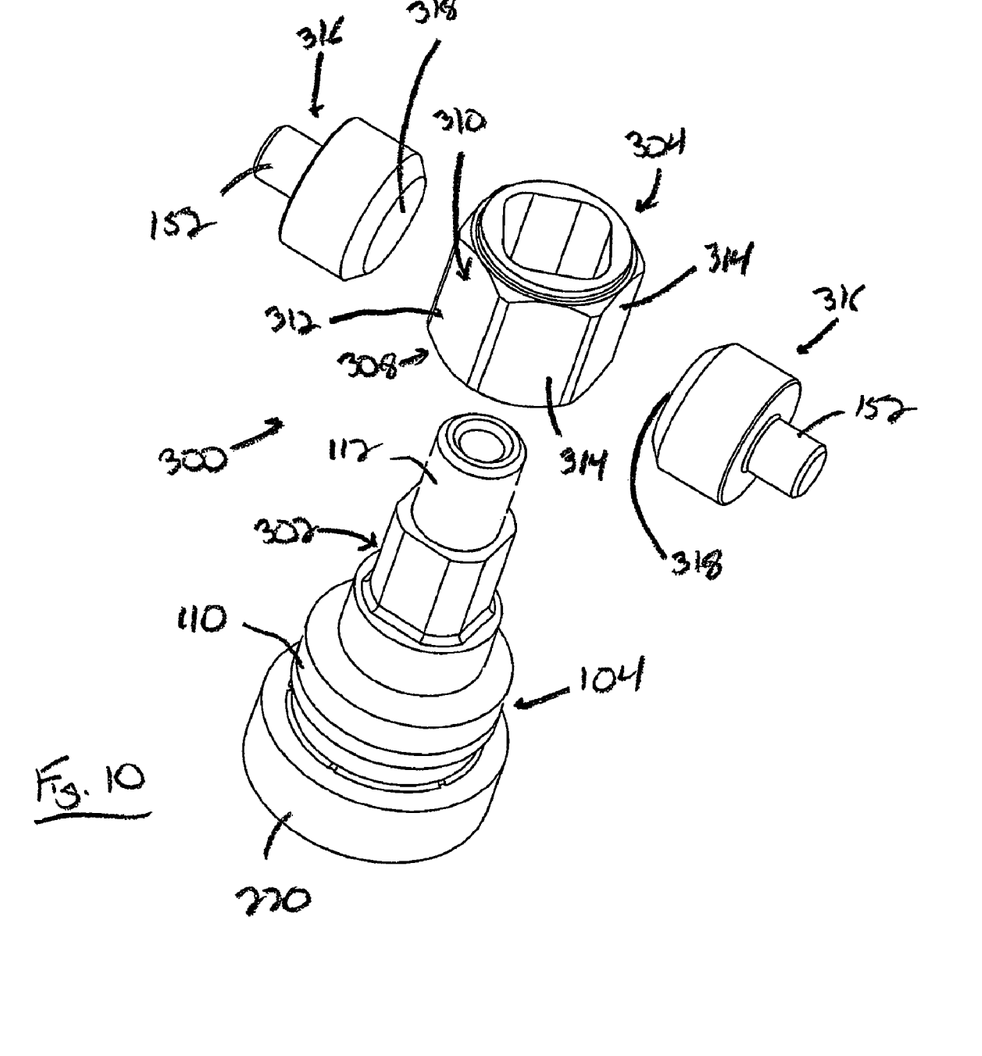
FIG. 10 is an exploded isometric view of a third embodiment of the torque limiting mechanism used in the tool of FIG. 7.

Referring now to FIG. 10, a third embodiment of the torque limiting mechanism 300 for use within the tool 100 is illustrated. In the mechanism 300, the shaft 104 is integrally formed with a central section 302 having a generally square-cross sectional area adjacent the inner section 112 of the drive shaft 104. A frictional cam member 304 is formed with a generally square-cross section aperture 306 extending through the center thereof that is positionable around the central section 302 on the drive shaft 104 to secure the cam member 304 to the drive shaft 104. The cam member 304 has an exterior surface 308 with a number engaging surfaces 310 formed thereon that, in a preferred embodiment, is formed as a hexagonal surface 312. The hexagonal surface 312 forms a number of flat friction panels 314 spaced equidistant around the surface 312. The surfaces 314 on opposite sides of the cam member 304 are engaged by plungers 316 having generally flat engaging surfaces 318 that are pressed against the friction panels 314 as a result of the bias of compression members 148 that engage the plungers 316 in the manner described with regard to the previous embodiments for the torque limiting mechanisms 132 and 132'. By adjusting the force exerted by the compression members 148 on the plungers 316, the force required to shift the cam member 304 with regard to the plungers 316, thereby overcoming the frictional forces created by the engagement of the panels 314 with the surfaces 318, can be adjusted to provide the torque limiting mechanism 300 with an appropriate torque limiting value for the tool 100.

Various other embodiments of the present invention are contemplated as being within the scope of the filed claims particularly pointing out and distinctly claiming the subject matter regarded as the invention.

What is claimed is:

1. A torque limiting mechanism for a torque wrench comprising:
   a) a central shaft including a frictional engaging ring disposed around an exterior periphery of the shaft;
   b) at least one frictional engaging pin disposed in frictional engagement with the frictional engaging ring;
   c) a first plunger including a number of parallel recesses in which the at least one frictional engaging pin is disposed, the number of recesses each shaped to receive the at least one frictional engaging pin to hold the at least one frictional engaging pin within the first plunger;
   d) an adjustable biasing member engaged with the first plunger opposite the at least one frictional engaging pin and configured to bias the frictional engaging pin into engagement with the frictional engagement ring, wherein the at least one frictional engaging pin is positionable in any of the number of the recesses; and
   e) a second plunger disposed adjacent the first frictional member opposite the first plunger, the second plunger including a number of recesses formed therein, wherein first plunger and the second plunger each include a central recess and recesses disposed on either side of the central recess, and wherein the frictional engaging pins are disposed in recesses other than in the central recess.

2. A torque limiting mechanism for a torque wrench comprising:
   a) a central shaft including a frictional engaging ring disposed around an exterior periphery of the shaft;
   b) at least one frictional engaging pin disposed in frictional engagement with the frictional engaging ring;
   c) a first plunger including a number of parallel recesses in which the at least one frictional engaging pin is disposed the number of recesses each shaped to receive the at least one frictional engaging pin to hold the at least one frictional engaging pin within the first plunger; and
   d) an adjustable biasing member engaged with the first plunger opposite the at least one frictional engaging pin and configured to bias the frictional engaging pin into engagement with the frictional engagement ring, wherein the at least one frictional engaging pin is positionable in any of the number of the recesses, wherein the first plunger includes a first portion including the number of recesses therein and a second portion extending outwardly from the first portion.

3. The mechanism of claim 2 wherein the second portion is disposed concentrically within the adjustable biasing member to assist in maintaining the alignment of the first plunger with respect to the central shaft.

4. The mechanism of claim 2 wherein the first portion has a diameter greater than a diameter of the second portion, and wherein the adjustable biasing member engages the first portion of the first plunger.

5. The mechanism of claim 2 wherein the adjustable biasing member comprises a number of spring washers disposed around the second portion of the first plunger.

6. The mechanism of claim 2 wherein each of the number of recesses has a depth greater than approximately one half of a diameter of the at least one frictional engaging pin.

7. A torque wrench comprising:
   a) a handle having an opening therein;
   b) a drive shaft disposed within the opening and extending outwardly from the handle, the drive shaft including a frictional engaging ring disposed on the drive shaft;
   c) at least one frictional engaging pin engaged with the frictional engaging ring;
   d) a plunger including a number of recesses in which the at least one frictional engaging pin is disposed, each of the number of recesses shaped to receive the at least one frictional engaging pin to hold the at least one frictional engaging pin within the plunger;
   e) a biasing member engaged with the at least one frictional engaging pin to urge the at least one frictional engaging pin into engagement with the frictional engaging ring; and
   f) an adjustment member engageable with the biasing member opposite the at least one frictional engaging pin to control the force exerted by the biasing member least one frictional engaging pin, wherein the plunger includes a first portion including the number of recesses therein and a second portion extending outwardly from the first portion.

8. The tool of claim 7 wherein the second portion of the plunger is disposed concentrically within the biasing member to assist in maintaining the alignment of the plunger with respect to the drive shaft.

9. The tool of claim 8 wherein the second portion of the plunger is disposed concentrically within the adjusting member to assist in maintaining the alignment of the plunger with respect to the drive shaft.

10. A torque limiting mechanism for a torque wrench comprising:
    a) a central shaft including a frictional engaging ring disposed around an exterior periphery of the shaft;
    b) at least one frictional engaging pin disposed in frictional engagement with the frictional engaging ring;
    c) a first plunger including a number of parallel recesses including a central recess and a number of recesses disposed on either side of the central recess in which the at least one frictional engaging pin is disposed, the recesses each shaped to receive the at least one frictional engaging pin to hold the at least one frictional engaging pin within the first plunger; and
    d) an adjustable biasing member engaged with the first plunger opposite the at least one frictional engaging pin and configured to bias the frictional engaging pin into engagement with the frictional engagement ring, wherein the at least one frictional engaging pin is positionable in any of the number of the recesses.

* * * * *